Aug. 7, 1945.  C. E. HUNZIKER  2,381,453
FILTER
Filed Sept. 14, 1939  2 Sheets-Sheet 1

INVENTOR.
CHARLES E. HUNZIKER
BY
Richards Geier
ATTORNEYS

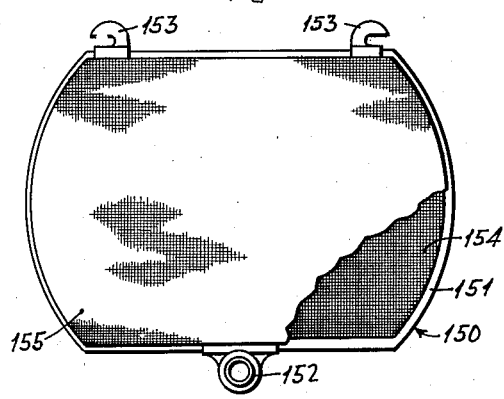
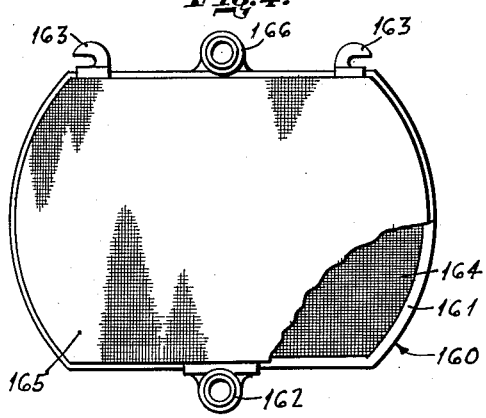
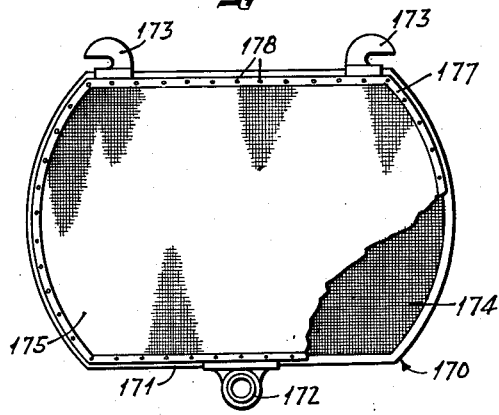
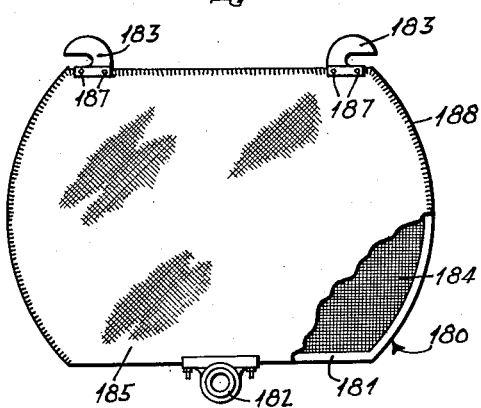
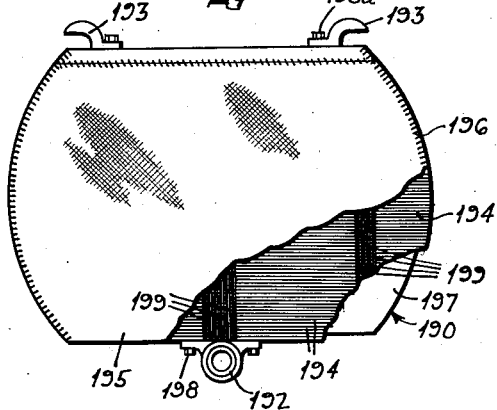
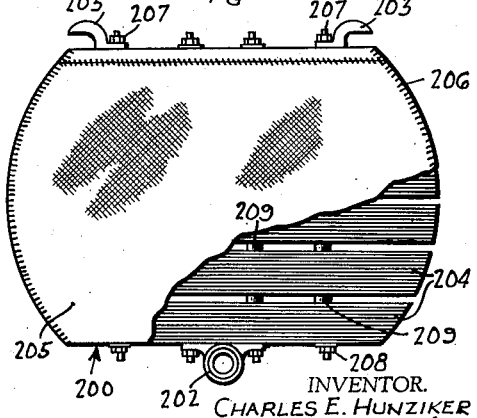
INVENTOR.
CHARLES E. HUNZIKER
BY
ATTORNEYS Patented Aug. 7, 1945

2,381,453

UNITED STATES PATENT OFFICE 2,381,453

FILTER

Charles Edward Hunziker, Paterson, N. J.

Application September 14, 1939, Serial No. 294,862

4 Claims. (Cl. 210—181)

This invention relates to a filter, and refers more particularly to a tank filter operating on the principle of the alluvial or pressure-leaf system, and applicable in chemical and pharmaceutical industries, for beverages, food industry and the like.

An object of the present invention is the provision of a filter through the use of which a very fine filtration with resultant highest degree of clarity and brilliance is attained without practically any preliminary run.

Another object is the provision of a filter which has a large output, is light in weight and simple to operate, and works at a low per gallon cost of filtrate.

A further object is the provision of a filter having a maximum output with the finest filtration, caused by the possibility of adapting the proper grade of the filtering material suitable to the viscosity and the degree of turbidity of the liquid to be filtered.

Other objects of the present invention will become apparent in the course of the following specification.

The objects of the present invention may be realized through the provision of a filter comprising a cylindrical tank shell containing a splash plate and a plurality of filter leaves suspended by supports within the shell in such manner that they extend parallel to the side surfaces of the shell, the leaves being adapted to be suspended from racks situated outside the shell when a side door of the tank is open. The door of the tank is swingably mounted on arms which are hingedly connected with the shell so that it can be opened and shut very quickly, a liquid-tight contact between the door and the shell being achieved by a plurality of substantially radially extending bars which are adapted to pass through locks carried by the shell and which press the door against the shell through the medium of a hand-wheel rotatably mounted upon a threaded spindle. The tank shell may be connected by pipes carrying a number of valves with a mixing tank and a pump by means of which the suspension of the filtering material in a carrying liquid and its floating upon the screens of the filter leaves is achieved. A number of filter tanks may be operated jointly and the filter leaves may be of different forms and materials.

The above and various other features of the present invention will appear more clearly from the following detailed description when taken in connection with the accompanying drawings, showing by way of example preferred embodiments of the inventive idea.

In the drawings:

Figures 3 to 8 show various filter plates or leaves in front elevation with some parts broken off.

Figure 1:
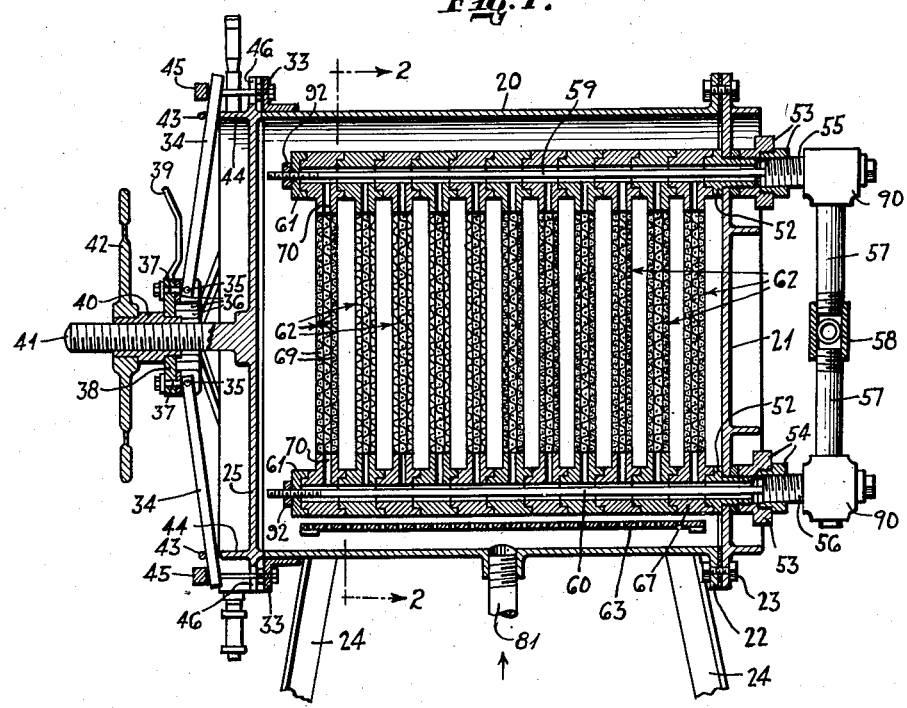
Figure 1 is a longitudinal section through a filter.
Figure 2:
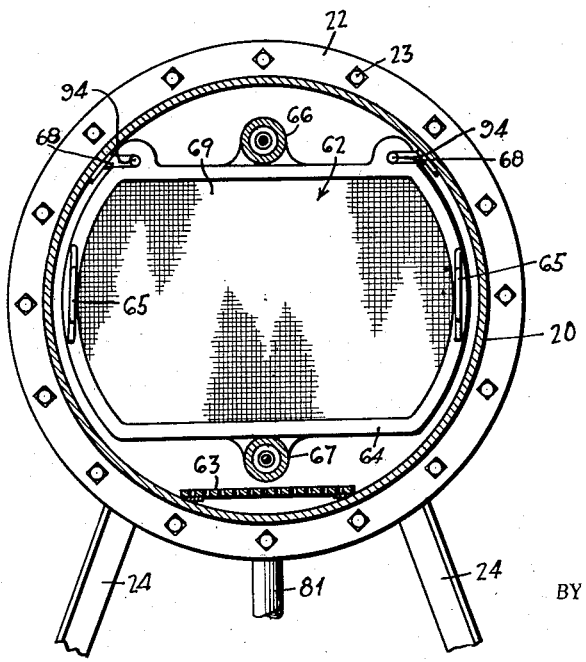
Figure 2 is a cross-section along the line 2—2 of Figure 1.

The filter tank illustrated in Figures 1 and 2 of the drawings comprises a cylindrical tank shell 20 having a rear wall 21 which is firmly attached to the flange 22 of the shell 20 by the bolts 23. The shell 20 is carried by supports or legs 24. The front door 25 of the filter tank is rotatably supported by two pivots which are situated in a vertical plane diametrically opposite one another.

The device for locking the cover 25, comprises a plurality of retractable bars or tightening levers 34 which extend substantially radially when the cover is closed. The inner end of each of the bars 34 is carried by a separate pivot 35. Each of the supports 36 is swingably mounted upon a separate pivot or belt 37. The pivots 37 are carried by an inner plate 38 which extends vertically and which is integral with an actuating arm 39. The plate 38 is mounted upon a sleeve 40 having inner threads which mesh with the threads of a rod or spindle 41 integral with the cover 25. The threaded rod 41 extends horizontally and is situated in the middle of the cover 25. A hand-wheel 42 is firmly mounted upon the sleeve 40.

The movable bars 34 extend through eyes 43 which are connected with an annular flange 44 carried by the cover 25.

The flange 33 of the shell 20 carries a plurality of eyes 45 which are situated opposite cutout portions formed in the edge 46 of the cover 25, so that the cover 25 does not extend over these eyes in its closed position. The ends of the bars 34 which pass through the eyes 43 of the cover 25, extend also through the eyes 45 of the shell 20 in the closed position of the tank. However, to enable an operator to open the cover 25, the bars 34 are withdrawn from the eyes 45.

A plate stand situated outside the tank comprises two plate racks (not illustrated) having hooked end portions which may extend through cutout portions provided in the cover 25 and may be hooked with the flange 33 of the shell 20. The opposite ends of the racks are carried by vertical supporting rods. In order to open the cover 25, it is necessary to withdraw the racks, which are then hooked on again.

The tank filter carries an inlet pressure gauge of the usual type. The rear wall 21 of the filter carries end fittings 52 upon which are screwed the union fittings 53 and 54. Threaded pipes 55 and 56 are screwed into the unions 54 and are connected with each other by manifolds or discharge pipes 57 carrying a cross-fitting 58.

An upper tie-rod 59 and a lower tie-rod 60 extend one above the other through the shell 20, the ends of these tie-rods being held in place within the pipes 55 and 56. The opposite ends of the tie-rods 59 and 60 carry caps 61 and tie-nuts 92 which are screwed upon the threaded portions of the tie-rods 59, the caps 61 being in contact with one of the filter-plates or leaves 62.

A splash plate 63 is situated at the bottom of the shell 20 and is provided with a plurality of openings used for the passage of the liquid and, preferably, situated opposite the spaces between the screens 69 of the filter plates 62.

The plates 62 situated within the filter tank may be of a variety of different forms and constructions. Each of the plates shown in Figures 1 and 2 comprises an outer frame 64 provided with handles 65 and two sleeves 66 and 67 enclosing discharge channels through which the tie-rods 59 and 60 extend. The frame 64 is also provided with hooks 68 which are used to support the plates upon the supports 94 within the tank or upon racks when the plates are moved out of the shell 20.

Each of the plates 62 has three wire screens 69 situated at a small distance one from the other and carried by the screen frame 64. Passages 70 provided in the screen frames 64 connect the inner spaces between the screens 69 with the channels enclosed by the sleeves 66 and 67.

In order to close the filter tank, the plates 62 are shifted from the racks into the interior of the shell 20 and are so arranged therein that the sleeves 66 and 67 of the innermost plate 69 are mounted upon the end fittings 52, as shown in Figure 6. The sleeves 66 and 67 of all the other plates 62 fit one into the other, while the sleeves 66 and 67 of the outermost plates 62 are held by caps 61 and tie-nuts 92, which are screwed upon the threaded ends of the tie-rods 59 and 60.

To close the cover 25, the operator turns the arm 39 which is integral with the plate 38. Since the ends of the retractable bars 34 are connected by pivots 35 with the supports 36, which are pivotally mounted upon the plate 38, this turning of the plate 38 will cause the bars 34 to move. The ends of the bars 34 will pass through the eyes 45 carried by the flange 33 of the shell 20, thereby locking the cover 25.

In order to provide a perfectly tight connection, the operator turns the wheel 42, which is rotatable along with the sleeve 40. The sleeve 40 will turn upon the threaded rod 41 and will be shifted in a direction toward the cover 25. Since the sleeve 40 is in engagement with the plate 38, the plate 38 will be also shifted toward the cover 25, thereby pressing the outer ends of the bars 34 against the flange 44 of the cover 25 and against the inside of the eyes 45. The eyes 45 are drawn outwardly, and being connected to the flange 33, pull the latter tightly up against the flange 46, the points at which the arms 34 abut the flange 44 acts as a fulcrum and due to the long lever arm between the fulcrum and the pivot point 35, high pressure is exerted providing a perfect liquidtight connection.

The operation of the described filter tank includes two preliminary operations necessary for the purpose of suspending the finely divided filtering material in the liquid carrying the same and alluviating the filtering material on the fine screens 69 of the filter plates 62.

The filtering materials generally employed consist of varying grades of asbestos, charcoal, or various other filter aids, such as diatomaceous earth.

The process of suspending this filtering material in the liquid to be filtered is carried out, in the first place, by pouring the liquid and the filtering material into a mixing tank (not illustrated), where the filtering material is thoroughly divided within the liquid and remains in suspension therein.

The second operation consists in alluviating the finely divided filtering material suspended in liquid on the fine screens 69 of the filter plates 62. In order to carry out this operation, a pump is now operated, the liquid will flow from the mixing tank into the pipe 81 leading to the shell 20 of the filter tank and will fill the interior of the filter, depositing the filtering material carried by it upon the wire screens 69 of the filter plates 62. The liquid will return to the tank through the manifold 57 and the cross fitting 58. Due to the driving action of the pump, the liquid carrying the filtering material in suspension will circulate through the filter tank and will gradually deposit all the filtering material carried by the liquid upon the sheets 69. The operator stops the pump when the liquid has become clear again, since this shows that the entire filtering material has been deposited upon the sheets 69. When using filter aids or charcoal, usually a thin layer of asbestos is first floated on the frames as the primary layer, and the filter aids or charcoal is gradually floated on this layer as the run progresses.

It was found that the filtering material, particularly asbestos, has an extremely sharp filtering effect on the microscopically fine particles of turbid matter. The described tank filter operates as a polishing filter and will deliver a large quantity of crystal-clear filtrate immediately after setting.

Figures 3 to 8 illustrate six different filter plates which may be used in conjunction with the described filter tanks. The filter plate 150, shown in Figure 3, comprises a frame or sheet metal edge 151 having a single discharge channel formed by a sleeve 152 and carrying upon its upper surface support hooks 153. The frame 151 carries an inner supporting screen 154 consisting of a wire mesh and two outer screens 155 only one of which is shown in the drawings. The screens 155 consist of a fine wire mesh and are soldered to the frame 151 of the filter 150.

The filter plate 160 shown in Figure 4 comprises a frame 161 provided with a lower sleeve 162 and an upper sleeve 166 constituting two discharge channels. The frame carries support hooks 163. The three screens of this filter plate consist of an inner supporting screen 164 and two outer fine mesh screens 165 which are soldered to the frame 161.

The filter plate 170 shown in Figure 5 comprises a frame or sheet metal edge 171 carrying a lower sleeve 172 constituting the single discharge channel and also carrying support hooks 173. The plate 170 is provided with an inner supporting screen 174 and two fine outer screens 175 consisting of metal. The screens 175 are attached to the frame 171 by band metal holders 177 carrying bolts 178.

The screen 180 shown in Figure 6 comprises a sheet metal frame or edge 181 carrying a sleeve 182 and support hooks 183. The metal frame 180 carries an inner supporting screen 184 and two outer screens 185 consisting of cloth which is sewed to the frame by seams 186 extending on three sides of the metal frame 180. The hooks 183 are attached to the frame 181 by bolts 187 which pass through the cloth sheets or screens 185.

The filter plate 190 shown in Figure 7 has no frame at all and comprises an inner molded rubber sheet or plate 194 which is corrugated for drainage purposes. In addition to the horizontal corrugations of the sheet 194, it may be also provided with vertical discharge grooves 199. The rubber sleeve 192 constituting the single discharge channel of this filter plate is attached by bolts 198 to the inner rubber plate 194. Metal inserts 197 may be situated on one or both sides of the inner rubber plate 194 to ensure rigidity. A cloth covering 195 encloses the rubber sheet 194 and the inserts 197 and is held by seams 196 sewn over the plate 194. The hooks 193 are connected with the cloth 195 by the bolts 198a.

The filter plate 200 shown in Figure 8 comprises a plurality of corrugated slabs 204 which are maintained at a distance from each other by rubber or metal spacers 209 and are held together by metallic tie-bolts 208. The slabs 204 which perform the function of an inner screen may be made of wood and are enclosed by a cloth covering 205, which is held by seams 206 sewed over the slabs 204. Hooks 203 which are made of rubber or metal are bolted over the cloth 205 by the bolts 207. The plate is provided with a lower sleeve 202 constituting a discharge channel.

It is apparent that the specific illustrations shown above have been given by way of illustration and not by way of limitation, and that the structures above described are subject to wide variation and modification without departing from the scope or intent of the invention, all of which variations and modifications are to be included within the scope of the present invention.

What is claimed is:

1. A filter of the character described comprising a shell, a stationary wall closing one end of the shell, a door for closing the opposite end of the shell, supporting and guiding members extending longitudinally within the shell, a plurality of parallel filter plates slidably supported on said supporting members in operative position within the shell and for movement into and out of the shell when the door is open, each of said filter plates comprising a body of filtering material having fluid passages therein, hollow projections at the top and bottom of the opposite faces of each filter plate, the projections of adjacent plates being formed to interfit to hold the plates engaged and spaced apart and forming upper and lower fluid conducting channels, nipples carried by and extending through said stationary wall and engaging and communicating with the projections on the outer face of one of the end plates of the series, caps engaging and closing the outer ends of the projections on the outer face of the other end plate of the series, couplings engaging the nipples at the outer side of the stationary plate, fluid conductors connected with said couplings, and tie rods extending through the projections of the plates, the caps, nipples and couplings and detachably connecting said parts together and holding the plates in assembled relation.

2. A filter of the character described comprising a shell, a stationary wall closing one end of the shell, a door for closing the opposite end of the shell, supporting and guiding members extending longitudinally within the shell, a plurality of parallel filter plates slidably supported on said supporting members for movement into and out of the shell when the door is open, each of said filter plates comprising a body of filtering material having passages therein, hollow projections at the top and bottom of the opposite faces of each filter plate, the projections of adjacent plates being formed to interfit to hold the plates engaged and spaced apart and forming upper and lower fluid conducting channels, nipples carried by and extending through said stationary wall and engaging and communicating with the projections on the outer faces of one of the end plates of the series, caps engaging and closing the outer ends of the projections on the outer face of the other end plate of the series, couplings engaging the nipples on the outer side of the stationary plate, fluid conductors connected with said couplings, tie rods extending through the projections of the plates, the caps, nipples and couplings and detachably connecting said parts together and holding the plates in assembled relation, a conductor communicating with the bottom of the shell, and a splash plate disposed in the shell between the plates and the bottom of the shell.

3. A filter of the character described, comprising a shell, a stationary wall closing one end of the shell, a door for closing the opposite end of the shell, supporting and guiding members extending longitudinally within the shell, a plurality of parallel filter plates slidably supported on said supporting members in operative position within the shell and for movement into and out of the shell when the door is open, each of said filter plates comprising a body of filtering material having fluid passages therein, hollow projections on the opposite faces of each filter plate, the projections of adjacent plates being formed to interfit to hold the plates engaged and spaced apart and forming fluid conducting channels communicating with said fluid passage, a nipple carried by and extending through said stationary wall and engaging and communicating with the projection at the adjacent side of one of the end plates of the series, a cap engaging and closing the outer end of the projections on the outer faces of the other end plate of the series, a coupling engaging the nipple at the outer side of the stationary plate, a fluid conductor connected with said coupling, and a tie rod extending through the projections of the plates, the cap, nipple and coupling and detachably connecting said parts together and holding the plates in assembled relation.

4. A filter of the character described comprising a shell, a stationary wall closing one end of the shell, a door for closing the opposite end of the shell, supporting and guiding members extending longitudinally within the shell, a plurality of parallel filter plates slidably supported on said supporting members in operative position within the shell and for movement into and out of the shell when the door is open, each of said filter plates comprising a body of filtering material having fluid passages therein, hollow projections at the top and bottom of the opposite faces of each filter plate, the projections of adjacent plates being formed to interfit to hold the plates engaged and spaced apart and forming upper and lower fluid conducting channels, nipples carried by and extending through said stationary wall and engaging and communicating with the projections on the outer face of one of the end plates of the series, caps engaging and closing the outer ends of the projections on the outer face of the other end plate of the series, couplings engaging the nipples at the outer side of the stationary plate, vertically arranged fluid conductors connecting with said couplings, a union connecting said conductors, horizontal conductors connected with the union, a valve in each of said horizontal conductors and a tie rod extending through the projections of the plates, the cap, nipple and coupling and detachably connecting said parts together and holding the plates in assembled relation.

CHARLES EDWARD HUNZIKER.